(12) United States Patent
Chiu

(10) Patent No.: US 11,054,982 B2
(45) Date of Patent: Jul. 6, 2021

(54) ELECTRONIC DEVICE, METHOD AND SYSTEM FOR DETECTING FINGERS AND NON-TRANSITORY COMPUTER-READABLE MEDIUM

(71) Applicant: HTC Corporation, Taoyuan (TW)

(72) Inventor: Wei-Cheng Chiu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 70 days.

(21) Appl. No.: 16/040,561

(22) Filed: Jul. 20, 2018

(65) Prior Publication Data

US 2019/0034072 A1 Jan. 31, 2019

Related U.S. Application Data

(60) Provisional application No. 62/538,792, filed on Jul. 30, 2017.

(51) Int. Cl.
*G06F 3/0488* (2013.01)
*G06F 3/01* (2006.01)
*G06F 3/0481* (2013.01)

(52) U.S. Cl.
CPC .......... *G06F 3/04883* (2013.01); *G06F 3/011* (2013.01); *G06F 3/0488* (2013.01); *G06F 3/04815* (2013.01); *G06F 2203/04101* (2013.01)

(58) Field of Classification Search
CPC .............................. G06F 1/1692; G06F 3/0488
See application file for complete search history.

(56) References Cited

U.S. PATENT DOCUMENTS

| | | | | | |
|---|---|---|---|---|---|
| 4,853,498 | A | * | 8/1989 | Meadows | G06F 3/041 345/174 |
| 5,400,244 | A | * | 3/1995 | Watanabe | G05D 1/0242 180/404 |
| 5,854,625 | A | * | 12/1998 | Frisch | G06F 3/0414 345/173 |
| 8,273,032 | B2 | * | 9/2012 | Carney | A61B 5/02427 600/500 |
| 8,310,456 | B2 | * | 11/2012 | Kim | G06F 3/0482 345/173 |

(Continued)

*Primary Examiner* — William Boddie
*Assistant Examiner* — Bipin Gyawali
(74) *Attorney, Agent, or Firm* — CKC & Partners Co., LLC

(57) ABSTRACT

An electronic device, method and system for detecting fingers and non-transitory computer-readable medium are provided in this disclosure. The electronic device includes a touch panel, a plurality of distance detection units, and a processor. The processor electrically connected to the touch panel and the distance detection units. The touch panel is configured for sensing a touched position. The distance detection units are configured for detecting a plurality of distance measurement signals. The processor is configured for calculating a plurality of measurement values according to the touched position and the distance measurement signals; determining a finger gesture information according to the measurement values, the finger gesture information indicating which one of a plurality of areas on the touched position is touched; and transmitting a finger gesture, based on the finger gesture information, to an external device to display a simulated finger gesture of an avatar in a simulated scenario.

20 Claims, 9 Drawing Sheets

(56) References Cited

U.S. PATENT DOCUMENTS

| | | | |
|---|---|---|---|
| 8,531,193 B2* | 9/2013 | Valisuo | G01D 5/2405 324/663 |
| 9,968,788 B2* | 5/2018 | Ecker | A61B 5/1459 |
| 9,987,962 B1* | 6/2018 | Salter | B60N 2/002 |
| 2009/0174679 A1* | 7/2009 | Westerman | G06F 3/0416 345/173 |
| 2010/0141607 A1* | 6/2010 | Ryoo | G06F 3/0416 345/177 |
| 2011/0063224 A1* | 3/2011 | Vexo | G06F 3/04886 345/168 |
| 2013/0135462 A1* | 5/2013 | Chen | G06T 7/73 348/135 |
| 2015/0205507 A1* | 7/2015 | Chen | G06F 3/04847 715/800 |
| 2016/0259487 A1* | 9/2016 | Hong | G06F 3/0436 |

* cited by examiner

S320

Utilizing a position of the first distance detection unit and the touched position to calculate a first distance value, a position of the second distance detection unit and the touched position to calculate a second distance value, and a position of the third distance detection unit and the touched position to calculate a third distance value by the processor ~S321

Utilizing magnitude of the first distance measurement signal and a threshold parameter of the first distance detection unit to calculate a first intensity value, magnitude of the second distance measurement signal and a threshold parameter of the second distance detection unit to calculate a second intensity value, and magnitude of the third distance measurement signal and a threshold parameter of the third distance detection unit to calculate a third intensity value by the processor ~S322

Obtaining a first measurement value according to the first distance value and the first intensity value, a second measurement value according to the second distance value and the second intensity value, and a third measurement value according to the third distance value and the third intensity value ~S323

Fig. 5

ELECTRONIC DEVICE, METHOD AND SYSTEM FOR DETECTING FINGERS AND NON-TRANSITORY COMPUTER-READABLE MEDIUM

CROSS-REFERENCE TO RELATED APPLICATION

This application claims priority to U.S. Provisional Application Ser. No. 62/538,792, filed on Jul. 30, 2017, which is herein incorporated by reference.

BACKGROUND

Field of Invention

The present application relates to an electronic device, method and system for detecting a touched position and non-transitory computer-readable medium. More particularly, the present application relates to an electronic device and method for determining a finger gesture which detected a touched position and non-transitory computer-readable medium.

Description of Related Art

In the current virtual reality (VR) environment, controller devices are commonly used to interact with VR scenes, such as game themes or VR contents. Usually, a virtual reality system has a head-mounted display (HMD) and controllers. There are several sensors disposed on the controller to detect the hand gestures. However, most of the controllers still have some detecting errors when the sensors detect the hand gestures or finger gestures. Therefore, a more precise device for providing simulated hand gestures or simulated finger gestures in the virtual reality environments is required.

SUMMARY

An aspect of the disclosure is to provide an electronic device for detecting fingers. The electronic device includes a touch panel, a plurality of distance detection units and a processor. The processor is electrically connected to the touch panel and the distance detection units. The processor is configured to calculate a plurality of measurement values according to the touched position and the distance measurement signals; determine a finger gesture information according to the measurement values, the finger gesture information indicating which one of a plurality of areas on the touched panel is touched; and transmitting a finger gesture, based on the finger gesture information, to an external device to display a simulated finger gesture of an avatar in a simulated scenario.

Another aspect of the disclosure is to provide a method for detecting fingers. The method includes operations of: sensing a touched position by a touch panel; detecting a plurality of distance measurement signals by a plurality of distance detection units; calculating a plurality of measurement values according to the touched position and the distance measurement signals by a processor; determining a finger gesture information according to the measurement values, the finger gesture information indicating which one of a plurality of areas on the touched panel is touched by the processor; and transmitting a finger gesture, based on the finger gesture information, to an external device to display a simulated finger gesture of an avatar in a simulated scenario by the processor.

Another aspect of the disclosure is to provide a system for detecting fingers and providing a simulated scenario. The system includes an external device, a controller, and a central processing unit. The central processing unit is electrically connected to the external device and the controller. The controller includes a touch panel, a plurality of distance detection units, and a processor. The processor is configured to calculate a plurality of measurement values according to the touched position and the distance measurement signals; determine a finger gesture information according to the measurement values, the finger gesture information indicating which one of a plurality of areas on the touched panel is touched. The central processing unit is configured for controlling the external device to display a simulated finger gesture of an avatar in the simulated scenario according to the finger gesture, based on the finger gesture information.

Another aspect of the disclosure is to provide a non-transitory computer-readable medium including one or more sequences of instructions to be executed by a processor of an electronic device for performing a method for detecting finger, wherein the method includes operations of: sensing a touched position by a touch panel; detecting a plurality of distance measurement signals by a plurality of distance detection units; calculating a plurality of measurement values according to the touched position and the distance measurement signals by a processor; determining a finger gesture information according to the measurement values, the finger gesture information indicating which one of a plurality of areas on the touched panel is touched by the processor; and transmitting a finger gesture, based on the finger gesture information, to an external device to display a simulated finger gesture of an avatar in a simulated scenario by the processor.

Based on aforesaid embodiments, electronic device, method and system for detecting fingers and non-transitory computer-readable medium are capable of calculating a plurality of measurement values according to the touched position and the distance measurement signals, determining a finger gesture according to the measurement values, and transmitting the finger gesture information to a head-mounted display to display a simulated finger gesture of an avatar in a simulated scenario. In some embodiments, the head-mounted display is able to display a simulated finger gesture of an avatar in the simulated scenario according to the finger gesture.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 5 is a flow diagram illustrating step S320 according to an embodiment of this disclosure.

DETAILED DESCRIPTION

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Figure 1:
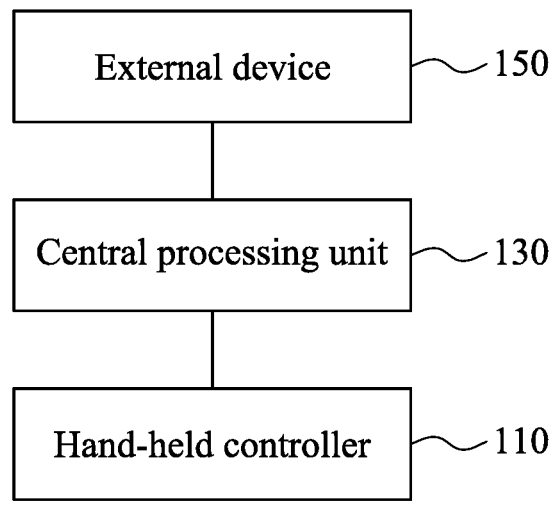
FIG. 1 is a functional block diagram illustrating a system according to an embodiment of the disclosure.

Reference is made to FIG. 1, which is a functional block diagram illustrating a system 100 according to an embodiment of the disclosure. As shown in FIG. 1, the system 100 includes a hand-held controller 110, a central processing unit 130 and an external device 150. The hand-held controller 110, the central processing unit (CPU) 130 and the external device 150 are in communication with each other. In some embodiments, the central processing unit 130 can be implemented by a GPU, or some control unit configured, and the external device 150 can be implemented by a head-mounted display (HMD).

Figure 2:
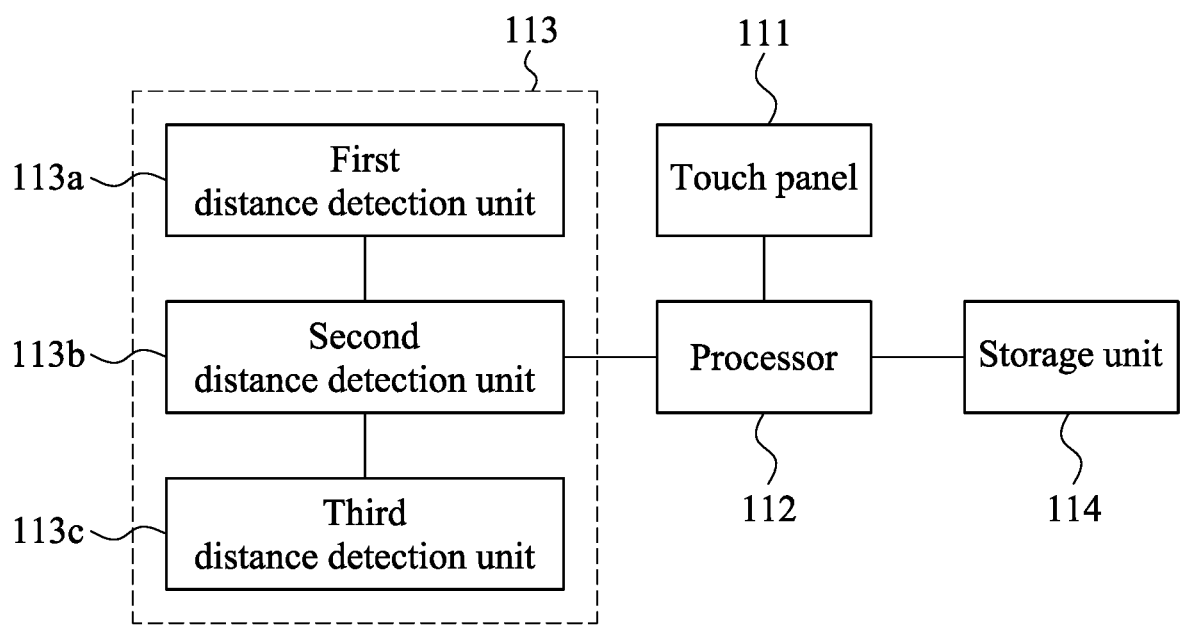
FIG. 2 is a functional block diagram illustrating a handheld controller according to an embodiment of the disclosure.

Reference is made to FIG. 2, which is a functional block diagram illustrating a hand-held controller 110 according to an embodiment of the disclosure. As shown in FIG. 2, the hand-held controller 110 includes a touch panel 111, a processor 112, a plurality of distance detection units 113, and a storage unit 114. The processor 112 is electrically connected to the touch panel 111, the distance detection units 113, and the storage unit 114. The touch panel 111 can be implemented by a capacitive touch panel or a resistive touch panel. The processor 112 can be implemented by a central processing unit, a control circuit and/or a graphics processing unit. The distance detection units 113 can be implemented by a proximity sensor (P-sensor), a pressure sensor and/or a temperature sensor. The storage unit 114 can be implemented by a memory, a hard disk, a flash drive, a memory card, etc.

Afterward, the distance detection units 113 include the first distance detection unit 113a, the second distance detection unit 113b, and the third distance detection unit 113c. The second distance detection unit 113b is electrically connected to the first distance detection unit 113a and the third distance detection unit 113c. The first distance detection unit 113a is configured to detect a first distance measurement signal, the second distance detection unit 113b is configured to detect a second distance measurement signal, and the third distance detection unit 113c is configured to detect a third distance measurement signal.

Figure 3:
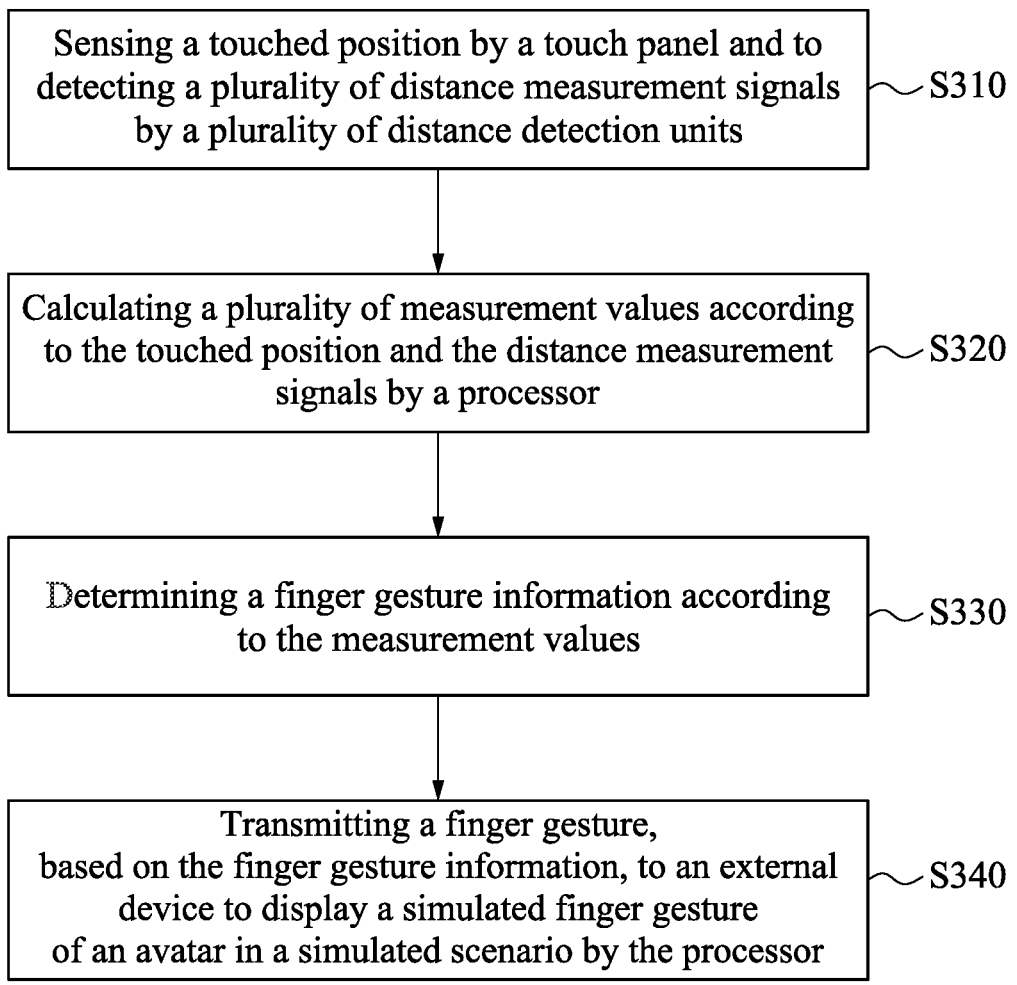
FIG. 3 is a flow diagram illustrating a method according to an embodiment of this disclosure.

Reference is made to FIG. 3, which is a flow diagram illustrating a method 300 according to an embodiment of this disclosure. In the embodiment, the method 300 for detecting finger can be utilized to calculate the measurement values, and to determine a finger gesture according to the measurement values. The finger gesture indicating which one of the fingers (middle finger, ring finger, or pinky finger) touches the touched position.

Figure 4:
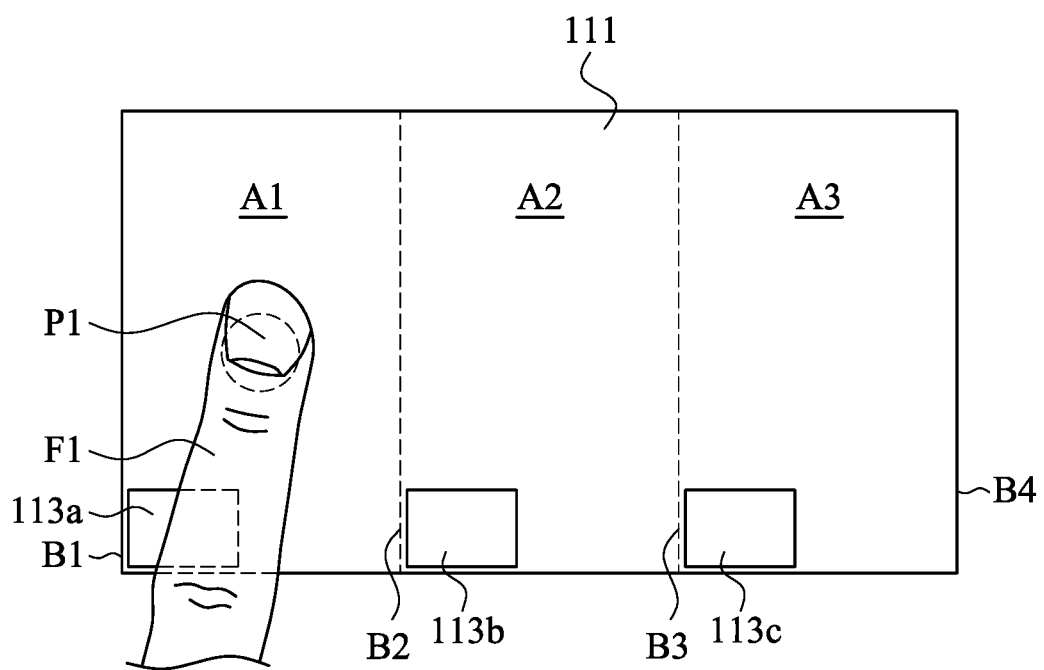
FIG. 4 is a schematic diagram illustrating the sensing of touch panel and distance detection units according to an embodiment of this disclosure.

Reference is made to FIG. 1 to FIG. 3. As the embodiment shown in FIG. 3, the method 300 firstly executes step S310 to sense a touched position by a touch panel 111 and to detect a plurality of distance measurement signals by a plurality of distance detection units 113. Reference is made to FIG. 4, which is a schematic diagram illustrating the sensing of touch panel 111 and distance detection units 113 according to an embodiment of this disclosure. In the embodiment, a plurality of areas A1, A2 and A3 are defined on the touch panel 111 by processor 112, the areas comprises a first area A1, a second area A2 and a third area A3. The first boundary B1 is located at a side of the first area A1, a second boundary B2 is located on an opposite side of the first area A1 and between the first area A1 and the second area A2, and a third boundary B3 is located between the second area A2 and the third area A3. The areas are not limited to define three areas in the embodiment. In another embodiment, the areas could be defined two areas, four areas or more areas.

In the embodiment, the first area A1 is represented as the middle finger area. It means that the first area A1 is touched by the middle finger. The second area A2 is represented as the ring finger area. It means that the second area A2 is touched by the ring finger. The third area A3 is represented as the pinky finger area. It means that the third area A3 is touched by the pinky finger.

In the embodiment, the first distance detection unit 113a is disposed adjacent to the first boundary B1 and far away from the second boundary B2. The second distance detection unit 113b is disposed adjacent to the second boundary B2 and far away from the third boundary B3. The third distance detection unit 113c is disposed adjacent to the third boundary B3. However, the disclosure is not limited thereto. In another embodiment, the first distance detection unit 113a is disposed adjacent to the second boundary B2 and far away from the first boundary B1, the second distance detection unit 113b is disposed adjacent to the third boundary B3 and far away from the second boundary B2, and the third distance detection unit 113c is disposed adjacent to a fourth boundary B4. The fourth boundary B4 is located at an opposite side of the third area A3.

Afterwards, the reason of the configuration of the first distance detection unit 113a, the second distance detection unit 113b, and the third distance detection unit 113c are related to the boundary. When the touched position is nearby the boundary between two areas, the touch panel 111 could not effectively determine the area (e.g. middle finger area, ring finger area or pinky finger area) touched by finger. Therefore, the distance detection units are utilized to support the touch panel 111 determines the touched area, when the touched position nearby the boundary.

Afterwards, as shown in FIG. 4, when a finger F1 touches the touch panel 111, the touch panel 111 is configured to sense a touched position P1, the first distance detection unit 113a is configured to detect a first distance measurement signal, the second distance detection unit 113b is configured to detect a second distance measurement signal, and the third distance detection unit 113c is also configured to detect a third distance measurement signal. In this case, the distance detection units 113a, 113b and 113c can be implemented by a proximity sensor, the proximity sensor often emits an electromagnetic radiation (e.g. infrared), and looks for changes in the return signal. Therefore, the first distance measurement signal, the second distance measurement signal and the third distance measurement signal are the return signal reflected from the finger F1. However, the disclosure is not limited thereto. In another case, the distance detection units 113a, 113b and 113c can be implemented by a pressure sensor or a temperature sensor. The pressure sensor would generate a signal as a function of the pressure imposed, and the temperature sensor also generates a signal as a function of the temperature touched.

Afterward, the method 300 executes step S320 to calculate a plurality of measurement values according to the touched position and the distance measurement signals by a processor 112. The step S320 further includes steps S321-S323, reference is made to FIG. 5, which is a flow diagram illustrating step S320 according to an embodiment of this disclosure. As the embodiment shown in FIG. 5, the method 300 executes step S321 to utilize a position of the first distance detection unit 113a and the touched position to calculate a first distance value, a position of the second distance detection unit 113b and the touched position to calculate a second distance value, and a position of the third distance detection unit 113c and the touched position to calculate a third distance value by the processor 112.

Figure 6:
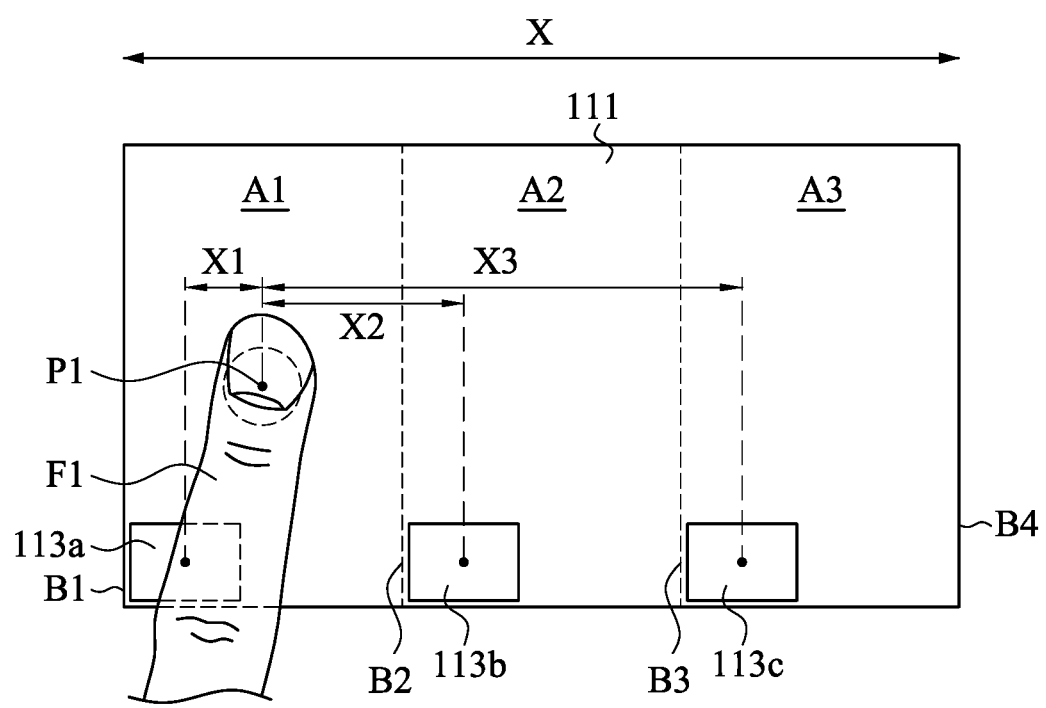
FIG. 6 is a schematic diagram illustrating the calculation of the distance values according to an embodiment of this disclosure.

Reference is made to FIG. 6, which is a schematic diagram illustrating the calculation of the distance values according to an embodiment of this disclosure. As the example shown in FIG. 6, when the finger F1 touches the touched position P1, there are a first distance X1 between the touched position P1 and the central position of the first distance detection unit 113a, a second distance X2 between the touched position P1 and the central position of the second distance detection unit 113b, and a third distance X3 between the touched position P1 and the central position of the third distance detection unit 113c. The first distance X1, the second distance X2, and the third distance X3 are in the direction x as shown in FIG. 6. Because position of the first distance detection unit 113a, the second distance detection unit 113b and the third distance detection unit 113c are fixed, the central position of the first distance detection unit 113a, the second distance detection unit 113b and the third distance detection unit 113c are obtained. The first distance value d1, the second distance value d2, and the third distance value d3 could be calculated by Formula 1. The first distance X1 is obtained by the x-coordinate X of the touched position P1 subtract to the x-coordinate X of the central position of the first distance detection unit 113a. The second distance X2 is obtained by the x-coordinate X of the touched position P1 subtract to the x-coordinate X of the central position of the second distance detection unit 113b. The third distance X3 is obtained by the x-coordinate X of the touched position P1 subtract to the x-coordinate X of the central position of the third distance detection unit 113c. Therefore, the first distance value d1, the second distance value d2, and the third distance value d3 are obtained.

$$d1 = \frac{1}{X1+1}, d2 = \frac{1}{X2+1}, d3 = \frac{1}{X3+1} \quad \text{(Formula 1)}$$

Afterward, the method 300 executes step S322 to utilize magnitude of the first distance measurement signal and a threshold parameter of the first distance detection unit 113a to calculate a first intensity value, magnitude of the second distance measurement signal and a threshold parameter of the second distance detection unit 113b to calculate a second intensity value, and magnitude of the third distance measurement signal and a threshold parameter of the third distance detection unit 113c to calculate a third intensity value by the processor 112. The first intensity value i1, the second intensity value i2, and the third intensity value i3 could be calculated by Formula 2. The storage unit 114 is configured to storing the threshold parameter of the first distance detection unit 113a, the threshold parameter of the second distance detection unit 113b, and the threshold parameter of the third distance detection unit 113c. The threshold parameter of the first distance detection unit 113a can be realized to include a first maximum Mmax1 and a first minimum Mmin1, and the first maximum Mmax1 and the first minimum Mmin1 are a default value. The first maximum Mmax1 and the first minimum Mmin1 are determined by the first distance detection unit 113a detected the magnitude of signal, and they are setup in outgoing inspection of the first distance detection unit 113a. The threshold parameter of the second distance detection unit 113b (includes the second maximum Mmax2 and the second minimum Mmin2) and the threshold parameter of the third distance detection unit 113c (includes the third maximum Mmax3 and the third minimum Mmin3) have the similar definition as the threshold parameter of the first distance detection unit 113a, and may not be discussed in details.

Based on aforesaid embodiments, the first intensity value i1, the second intensity value i2, and the third intensity value i3 could be calculated by Formula 2. The parameter Mcur1 can be realized as the magnitude of the first distance measurement signal, the parameter Mcur2 can be realized as the magnitude of the second distance measurement signal, and the parameter Mcur3 can be realized as the magnitude of the third distance measurement signal. As the embodiment shown in FIG. 6, when the finger F1 touches the touched position P1, the magnitude Mcur1 of the first distance measurement signal is larger than the magnitude Mcur2 of the second distance measurement signal and magnitude Mcur3 of the third distance measurement signal. The threshold parameter of the first distance detection unit 113a, the threshold parameter of the second distance detection unit 113b, and the threshold parameter of the third distance detection unit 113c are similar with each other, because characteristic of the distance detection units 113 are similar. Therefore, the first intensity value i1, the second intensity value i2, and the third intensity value i3 are determined by the parameter Mcur1, Mcur2 and Mcur3. In this case, the first intensity value i1 is larger than the second intensity value i2 and the third intensity value i3.

$$i1 = \frac{Mcur1 - M\min1}{M\max1},$$
$$i2 = \frac{Mcur2 - M\min2}{M\max2},$$
$$i3 = \frac{Mcur3 - M\min3}{M\max3}$$
(Formula 2)

Afterward, the method 300 executes step S323 to obtain a first measurement value according to the first distance value d1 and the first intensity value i1, a second measurement value according to the second distance value d2 and the second intensity value i2, and a third measurement value according to the third distance value d3 and the third intensity value i3. In the embodiment, the first measurement value m1, the second measurement value m2, and the third measurement value m3 could be calculated by Formula 3. The first distance value d1, the second distance value d2, and the third distance value d3 have a first weight in calculating the first measurement value m1, the second measurement value m2, and the third measurement value m3. The first intensity value i1, the second intensity value i2, and the third intensity value i3 have a second weight in calculating the first measurement value m1, the second measurement value m2, and the third measurement value m3. The first weight is larger than the second weight, in other words, the dominating parameter is the distance value, if the first distance value d1 is larger than the second distance value d2 and the third distance value d3, and the first measurement value m1 could be larger than the second measurement value m2 and the third measurement value m3.

$$m1=d1\times i1, m2=d2\times i2, m3=d3\times i3$$
(Formula 3)

Afterward, the method 300 executes step S330 to determine a finger gesture information according to the measurement values. In aforesaid embodiment, when the finger F1 touches the touched position in the first area A1, the processor is configured to calculate the first measurement value m1, the second measurement value m2, and the third measurement value m3. Because the first distance X1 is shorter than the second distance X2 and the third distance X3, and the parameter Mcur1 is larger than the parameter Mcur2 and Mcur3, therefore, the first measurement value m1 is larger than the second measurement value m2 and the third measurement value m3. The processor 112 would select the maximum in the first measurement value m1, the second measurement value m2, and the third measurement value m3, the first measurement value m1, the second measurement value m2, and the third measurement value m3 are represented as probability of the areas touched by finger, respectively. As the example shown in FIG. 6, the processor 112 determines the first measurement value m1 is the maximum, and the first area A1 corresponding to the first measurement value m1 can be realized to the area with the highest probability of being touched. Therefore, the processor 112 can understand that the touched position P1 is touched by the middle finger according to the first measurement value m1.

Figure 7A:
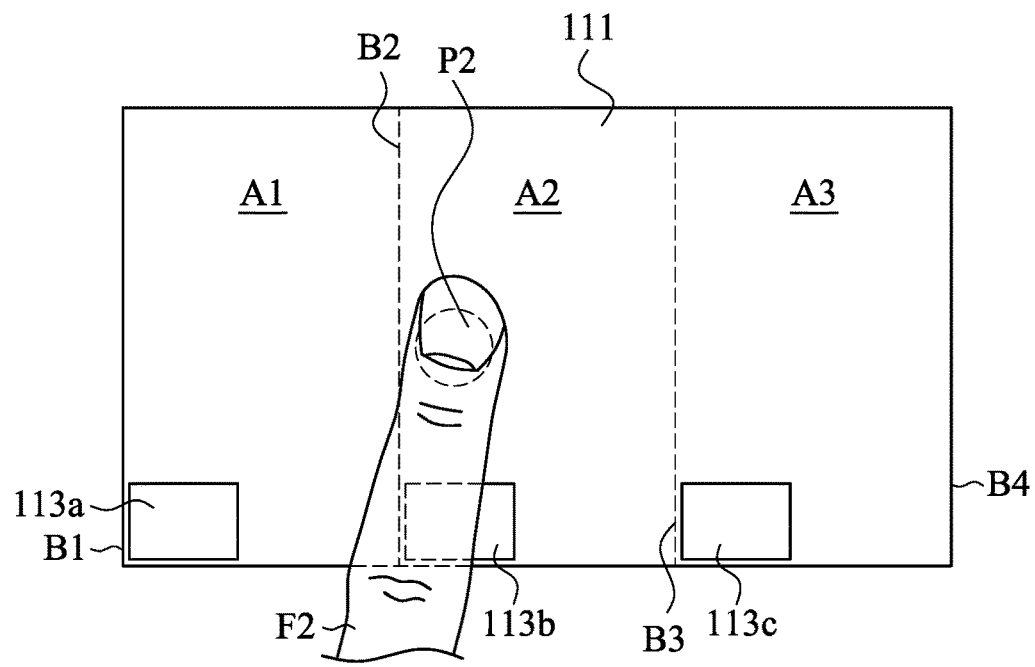
FIG. 7A is a schematic diagram illustrating the detecting of finger gesture according to an embodiment of this disclosure.

Reference is made to FIG. 7A, which is a schematic diagram illustrating the detecting of finger gesture according to an embodiment of this disclosure. As the example shown in FIG. 7A, when the finger F2 touches the touched position P2, the distance values between touched position P2 and the first distance detection unit 113a, the second distance detection unit 113b and the third distance detection unit 113c are calculated by Formula 1. The intensity value of the first distance detection unit 113a, the second distance detection unit 113b and the third distance detection unit 113c are calculated by Formula 2. The measurement values are calculated by Formula 3. As shown in FIG. 7A, the touched position P2 is located in second area A2, but it is adjacent to the second boundary B2. In this case, when the finger F2 touches the touched position P2, the second distance detection unit 113b are utilized to support the touch panel 111 determines the touched area. The second measurement value m2 is larger than the first measurement value m1 and the third measurement value m3. Therefore, the processor 112 can understand that the touched position P2 is touched by the ring finger according to the second measurement value m2.

Figure 7B:
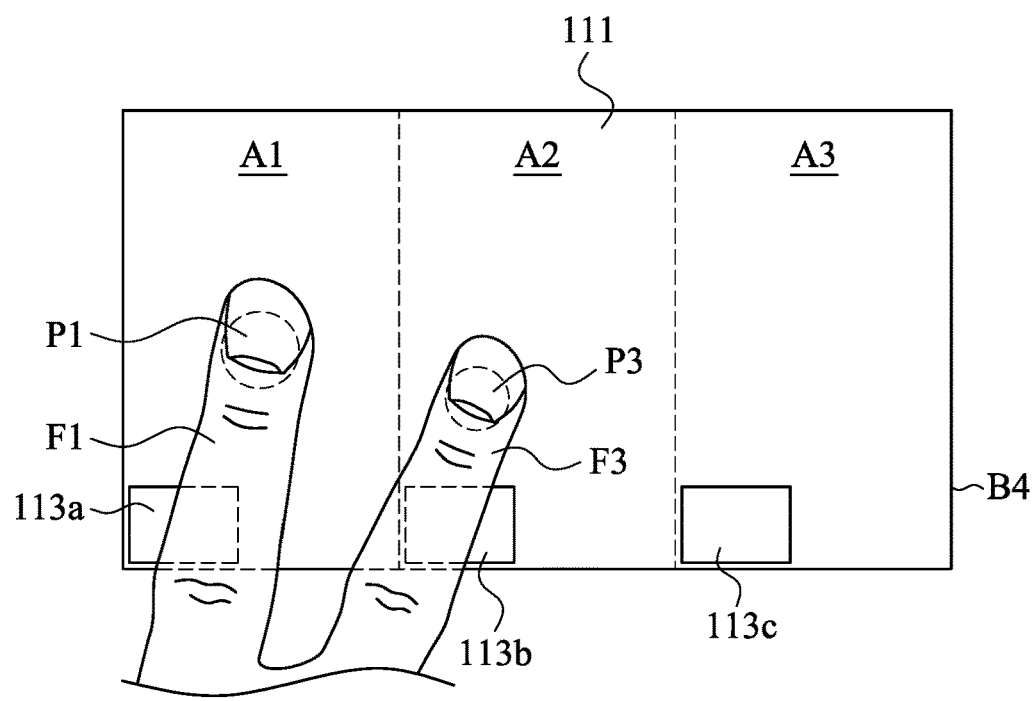
FIG. 7B is a schematic diagram illustrating the detecting of finger gesture according to an embodiment of this disclosure.

Reference is made to FIG. 7B, which is a schematic diagram illustrating the detecting of finger gesture according to an embodiment of this disclosure. As the example shown in FIG. 7B, the finger F1 is the same as the finger as shown in FIG. 6, in the FIG. 6, the finger F1 is determined as the middle finger by the processor 112. In the FIG. 7B, there are another finger F3 touches the touched position P3, and the calculation of the first measurement value m1, the second measurement value m2, and the third measurement value m3 are the same as aforesaid embodiment. The second distance X2 is larger than the first distance X1 and the third distance X3, and the second intensity value i2 could be larger than the first intensity value i1 and the third intensity value i3. Therefore, the second measurement value m2 will be larger than the first measurement value m1 and the third measurement value m3. The processor 112 determines the second measurement value m2 is the maximum, and the processor 112 can understand that the touched position P3 is touched by the ring finger according to the second measurement value m2.

Figure 8A:
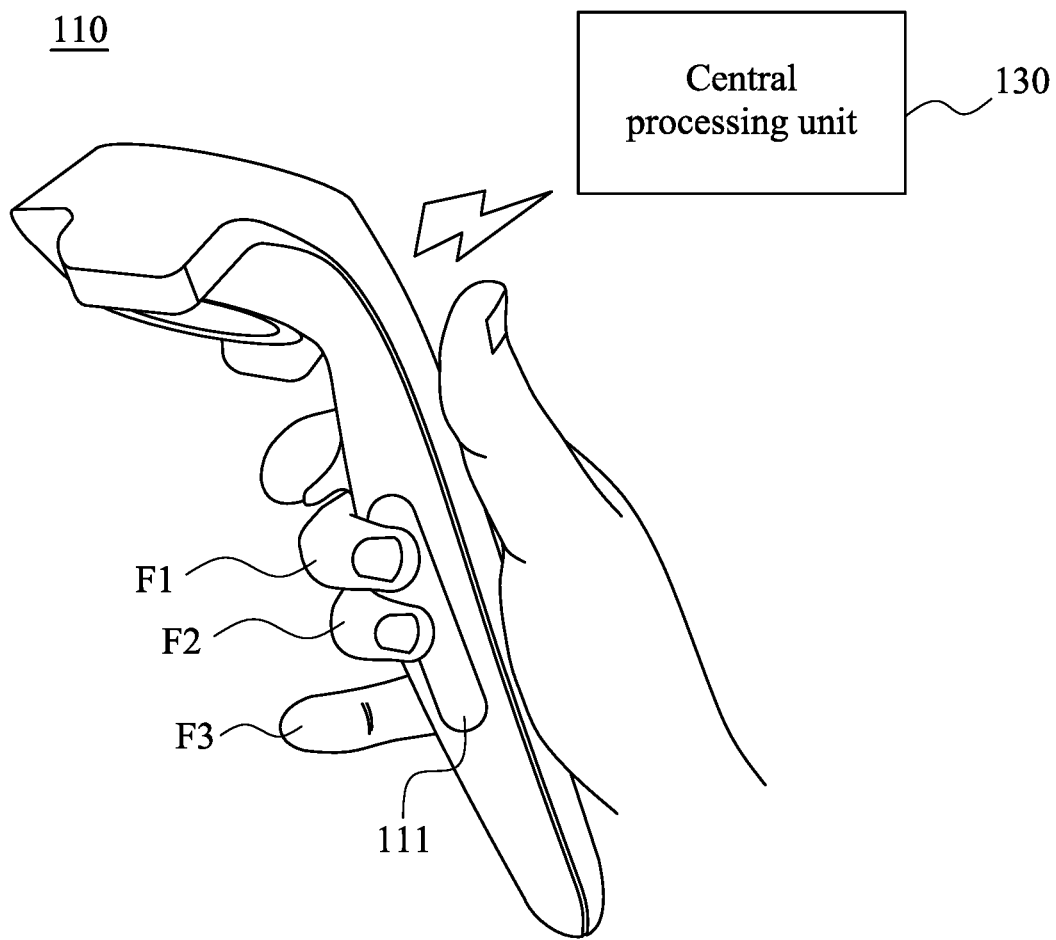
FIG. 8A is a schematic diagram illustrating the hand-held controller according to an embodiment of this disclosure.
Figure 8B:
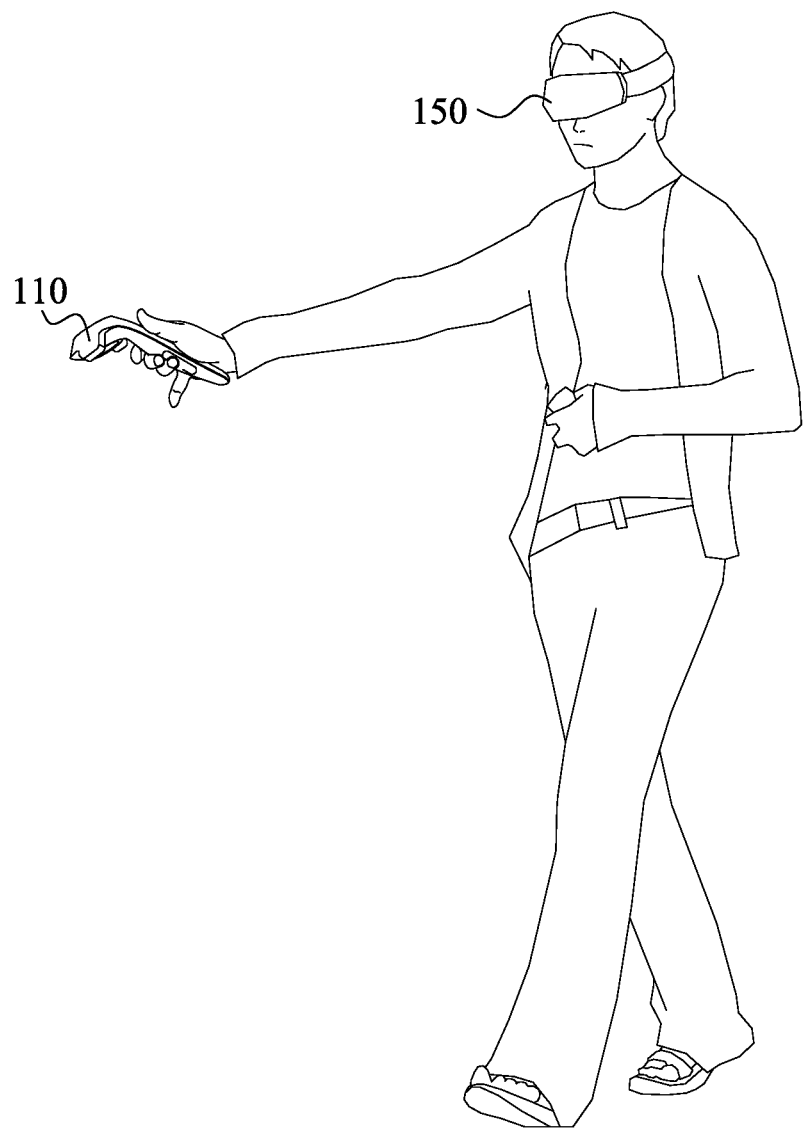
FIG. 8B is a schematic diagram illustrating the system for detecting fingers according to an embodiment of this disclosure.

Afterward, the method 300 executes step S340 to transmit a finger gesture, based on the finger gesture information, to an external device 150 to display a simulated finger gesture of an avatar in a simulated scenario by the processor 112. Reference is made to FIG. 8A and FIG. 8B, FIG. 8A is a schematic diagram illustrating the hand-held controller 110 according to an embodiment of this disclosure, and FIG. 8B is a schematic diagram illustrating the system 100 for detecting fingers according to an embodiment of this disclosure. As shown in FIG. 8A and FIG. 8B, the hand-held controller 110 detects the finger gesture and transmits the finger gesture information to the central processing unit 130 via wireless transmission or cable transmission. The finger gesture information indicating which one of the fingers touches the touched position. In the example shown in FIG. 8A, the finger F1 and F2 touch the touched panel 111, and the processor 112 (not shown in FIG. 8A) transmits the finger gesture information (middle finger and ring finger touch the touched panel 111, but the pinky finger does not touch the touched panel 111) to the central processing unit 130. As shown in FIG. 8B, the user wears the hand-held controller 110 and the external device 150, when the central processing unit 130 receives the finger gesture information from the hand-held controller 110, the central processing unit 130 would transmit the finger gesture to the external device 150. The external device 150 displays a simulated finger gesture of an avatar in a simulated scenario.

Figure 8C:
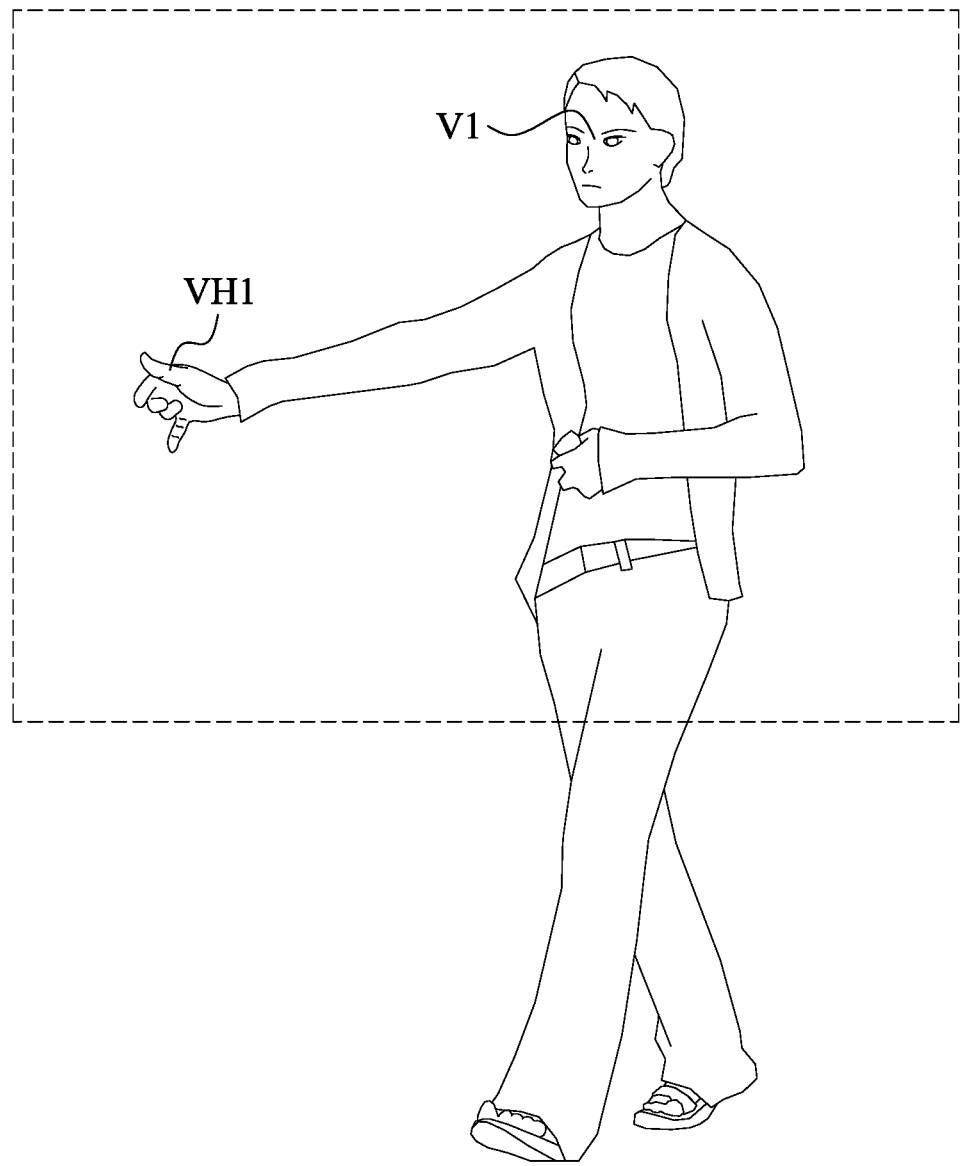
FIG. 8C is a schematic diagram of a system for detecting finger gesture and providing a simulated scenario according to the embodiments of FIG. 8B.

FIG. 8C is a schematic diagram of a system for detecting finger gesture and providing a simulated scenario according to the embodiments of FIG. 8B. As shown in FIG. 8B, the finger gesture information is transmitted to the central processing unit 130 by the hand-held controller 110 and the central processing unit 130 transmitted the finger gesture to the external device 150. The external device 150 may illustrate a simulated hand gesture VH1 of avatar V1 corresponding to user in the simulated scenario. As such, user may perform more complicated hand gestures in the real world, and the external device 150 may display simulated hand gestures of user in the simulated environment.

Another embodiment of the disclosure is a non-transitory computer-readable storage medium. The non-transitory computer readable storage medium stores instructions for performing the method 300 for detecting finger in aforesaid embodiment shown in FIG. 3.

Based on aforesaid embodiments, electronic device, method, system and non-transitory computer-readable medium for detecting fingers are capable of calculating a plurality of measurement values according to the touched position and the distance measurement signals, determining a finger gesture according to the measurement values, and transmitting the finger gesture to a head-mounted display to display a simulated finger gesture of an avatar in a simulated scenario. In some embodiments, the head-mounted display is able to display a simulated finger gesture of an avatar in the simulated scenario according to the finger gesture.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A hand-held controller for detecting fingers, comprising:
a touch panel, configured for sensing a touched position on the touch panel, wherein a plurality of areas are defined on the touch panel;
a plurality of distance detection sensors, configured for detecting a plurality of distance measurement signals; and
a processor electrically connected to the touch panel and the distance detection sensors, is configured to:
calculate a plurality of distances at a same direction between each of the distance detection sensors and the touched position;
calculate a plurality of distance values according to the distances, wherein the distance values are inversely proportional to the distances respectively;
determine a finger gesture information according to the plurality of distance measurement signals and the plurality of distance values, the finger gesture information indicating which one of the areas on the touched panel is touched; and
transmit a finger gesture, based on the finger gesture information, to an external device to display a simulated finger gesture of an avatar in a simulated scenario, wherein the finger gesture indicates which one of a plurality of fingers touches the areas, and each of the areas is corresponding to each of the fingers.

2. The hand-held controller of claim 1, wherein the distance detection sensors further comprising:
a first distance detection sensor, configured for detecting a first distance measurement signal;
a second distance detection sensor, configured for detecting a second distance measurement signal; and
a third distance detection sensor, configured for detecting a third distance measurement signal.

3. The hand-held controller of claim 2, wherein the areas comprises a first area, a second area and a third area, a first boundary is located at a side of the first area, a second boundary is located on an opposite side of the first area and between the first area and the second area, and a third boundary is located between the second area and the third area.

4. The hand-held controller of claim 3, wherein the first distance detection sensor is disposed adjacent to the first boundary and far away from the second boundary; the second distance detection sensor is disposed adjacent to the second boundary and far away from the third boundary; the third distance detection sensor is disposed adjacent to the third boundary.

5. The hand-held controller of claim 2, wherein the processor is further configured for executing following steps:
utilizing a position of the first distance detection sensor and the touched position to calculate a first distance value, a position of the second distance detection sensor and the touched position to calculate a second distance value, and a position of the third distance detection sensor and the touched position to calculate a third distance value;
utilizing magnitude of the first distance measurement signal and a threshold parameter of the first distance detection sensor to calculate a first intensity value, magnitude of the second distance measurement signal and a threshold parameter of the second distance detection sensor to calculate a second intensity value, and magnitude of the third distance measurement signal and a threshold parameter of the third distance detection sensor to calculate a third intensity value; and obtaining a first measurement value according to the first distance value and the first intensity value, a second measurement value according to the second distance value and the second intensity value, and a third measurement value according to the third distance value and the third intensity value.

6. The hand-held controller of claim 5, wherein the processor is further configured for executing following steps:

selecting one of the first measurement value, the second measurement value, and the third measurement value;

if the first measurement value is selected, the touched position is touched by middle finger;

if the second measurement value is selected, the touched position is touched by ring finger; and if the third measurement value is selected, the touched position is touched by pinky finger.

7. The hand-held controller of claim 5, wherein the first distance value, the second distance value, and the third distance value have a first weight in calculating the first measurement value, the second measurement value, and the third measurement value;

wherein the first intensity value, the second intensity value, and the third intensity value have a second weight in calculating the first measurement value, the second measurement value, and the third measurement value, the first weight is larger than the second weight.

8. A method for detecting finger, comprising:

sensing a touched position by a touch panel, wherein a plurality of areas are defined on the touch panel;

detecting a plurality of distance measurement signals by a plurality of distance detection sensors;

calculating a plurality of distances at a same direction between each of the distance detection sensors and the touched position by a processor;

calculating a plurality of distance values by the processor according to the distances, wherein the distance values are inversely proportional to the distances respectively;

determining a finger gesture information by the processor according to the plurality of distance measurement signals and the plurality of distance values, the finger gesture information indicating which one of the areas on the touched panel is touched; and transmitting a finger gesture by the processor, based on the finger gesture information, to an external device to display a simulated finger gesture of an avatar in a simulated scenario, wherein the finger gesture indicates which one of a plurality of fingers touches the areas, and each of the areas is corresponding to each of the fingers.

9. The method of claim 8, wherein the distance detection sensors comprises a first distance detection sensor, a second distance detection sensor, and a third distance detection sensor, and detecting the distance measurement signals by the distance detection sensors further comprising:

detecting a first distance measurement signal by the first distance detection sensor;

detecting a second distance measurement signal by the second distance detection sensor; and detecting a third distance measurement signal by the third distance detection sensor.

10. The method of claim 9, further comprising:

utilizing a position of the first distance detection sensor and the touched position to calculate a first distance value at a first direction, a position of the second distance detection sensor and the touched position to calculate a second distance value at the first direction, and a position of the third distance detection sensor and the touched position to calculate a third distance at the first direction value by the processor;

utilizing a difference value between magnitude of the first distance measurement signal and a threshold parameter of the first distance detection sensor to calculate a first intensity value, a difference value between magnitude of the second distance measurement signal and a threshold parameter of the second distance detection sensor to calculate a second intensity value, and a difference value between magnitude of the third distance measurement signal and a threshold parameter of the third distance detection sensor to calculate a third intensity value by the processor; and obtaining a first measurement value according to a product of the first distance value and the first intensity value, a second measurement value according to a product of the second distance value and the second intensity value, and a third measurement value according to a product of the third distance value and the third intensity value by the processor.

11. The method of claim 10, further comprising:

selecting one of the first measurement value, the second measurement value, and the third measurement value by the processor;

if the first measurement value is selected, the touched position is touched by middle finger;

if the second measurement value is selected, the touched position is touched by ring finger; and if the third measurement value is selected, the touched position is touched by pinky finger.

12. The method of claim 10, wherein the first distance value, the second distance value, and the third distance value have a first weight in calculating the first measurement value, the second measurement value, and the third measurement value;

wherein the first intensity value, the second intensity value, and the third intensity value have a second weight in calculating the first measurement value, the second measurement value, and the third measurement value, the first weight is larger than the second weight.

13. The method of claim 9, wherein the areas comprises a first area, a second area and a third area, a first boundary is located at a side of the first area, a second boundary is located on an opposite side of the first area and between the first area and the second area, and a third boundary is located between the second area and the third area.

14. The method of claim 13, wherein the first distance measurement signal is detected by the first distance detection sensor from a position around adjacent to the first boundary and far away from the second boundary; the second distance measurement signal is detected by the second distance detection sensor from a position around adjacent to the second boundary and far away from the third boundary; and the third distance measurement signal is detected by the third distance detection sensor from a position around adjacent to the third boundary.

15. A system for detecting fingers and providing a simulated scenario, comprising:
- an external device, configured for displaying the simulated scenario;
- a controller, comprising:
  - a touch panel, configured for sensing a touched position on the touch panel, wherein a plurality of areas are defined on the touch panel;
  - a plurality of distance detection sensors, configured for detecting a plurality of distance measurement signals; and
  - a processor electrically connected to the touch panel and the distance detection sensors, is configured to:
    - calculate a plurality of distances at a same direction between each of the distance detection sensors and the touched position;
    - calculate a plurality of distance values according to the distances, wherein the distance values are inversely proportional to the distances respectively; and
    - determine a finger gesture information according to the plurality of distance measurement signals and the plurality of distance values, the finger gesture information indicating which one of the areas on the touched panel is touched; and
- a central processing unit electrically connected to the external device and the controller, configured for controlling the external device to display a simulated finger gesture of an avatar in the simulated scenario according to a finger gesture of the finger gesture information, wherein the finger gesture indicates which one of a plurality of fingers touches the areas, and each of the areas is corresponding to each of the fingers.

16. The system of claim 15, wherein the distance detection sensors further comprising:
- a first distance detection sensor, configured for detecting a first distance measurement signal;
- a second distance detection sensor, configured for detecting a second distance measurement signal; and
- a third distance detection sensor, configured for detecting a third distance measurement signal.

17. The system of claim 16, wherein the processor is further configured for executing following steps:
- utilizing a position of the first distance detection sensor and the touched position to calculate a first distance value, a position of the second distance detection sensor and the touched position to calculate a second distance value, and a position of the third distance detection sensor and the touched position to calculate a third distance value;
- utilizing magnitude of the first distance measurement signal and a threshold parameter of the first distance detection sensor to calculate a first intensity value, magnitude of the second distance measurement signal and a threshold parameter of the second distance detection sensor to calculate a second intensity value, and magnitude of the third distance measurement signal and a threshold parameter of the third distance detection sensor to calculate a third intensity value; and
- obtaining a first measurement value according to the first distance value and the first intensity value, a second measurement value according to the second distance value and the second intensity value, and a third measurement value according to the third distance value and the third intensity value.

18. The system of claim 17, wherein the processor is further configured for executing following steps:
- selecting one of the first measurement value, the second measurement value, and the third measurement value;
- if the first measurement value is selected, the touched position is touched by middle finger;
- if the second measurement value is selected, the touched position is touched by ring finger; and
- if the third measurement value is selected, the touched position is touched by pinky finger.

19. A non-transitory computer-readable medium including one or more sequences of instructions to be executed by a processor of a hand-held controller for performing a method for detecting finger, wherein the method comprises:
- sensing a touched position by a touch panel, wherein a plurality of areas are defined on the touch panel;
- detecting a plurality of distance measurement signals by a plurality of distance detection sensors;
- calculating a plurality of distances at a same direction between each of the distance detection sensors and the touched position by a processor;
- calculating a plurality of distance values by the processor according to the distances, wherein the distance values are inversely proportional to the distances respectively;
- determining a finger gesture information by the processor according to the plurality of distance measurement signals and the plurality of distance values, the finger gesture information indicating which one of the areas on the touched panel is touched; and
- transmitting a finger gesture by the processor, based on the finger gesture information, to an external device to display a simulated finger gesture of an avatar in a simulated scenario,
- wherein the finger gesture indicates which one of a plurality of fingers touches the areas, and each of the areas is corresponding to each of the fingers.

20. The non-transitory computer-readable medium of claim 19, wherein the distance detection sensors comprises a first distance detection sensor, a second distance detection sensor, and a third distance detection sensor, and detecting the distance measurement signals by the distance detection sensors further comprising:
- detecting a first distance measurement signal by the first distance detection sensor;
- detecting a second distance measurement signal by the second distance detection sensor; and
- detecting a third distance measurement signal by the third distance detection sensor.

* * * * *